Patented Aug. 12, 1941

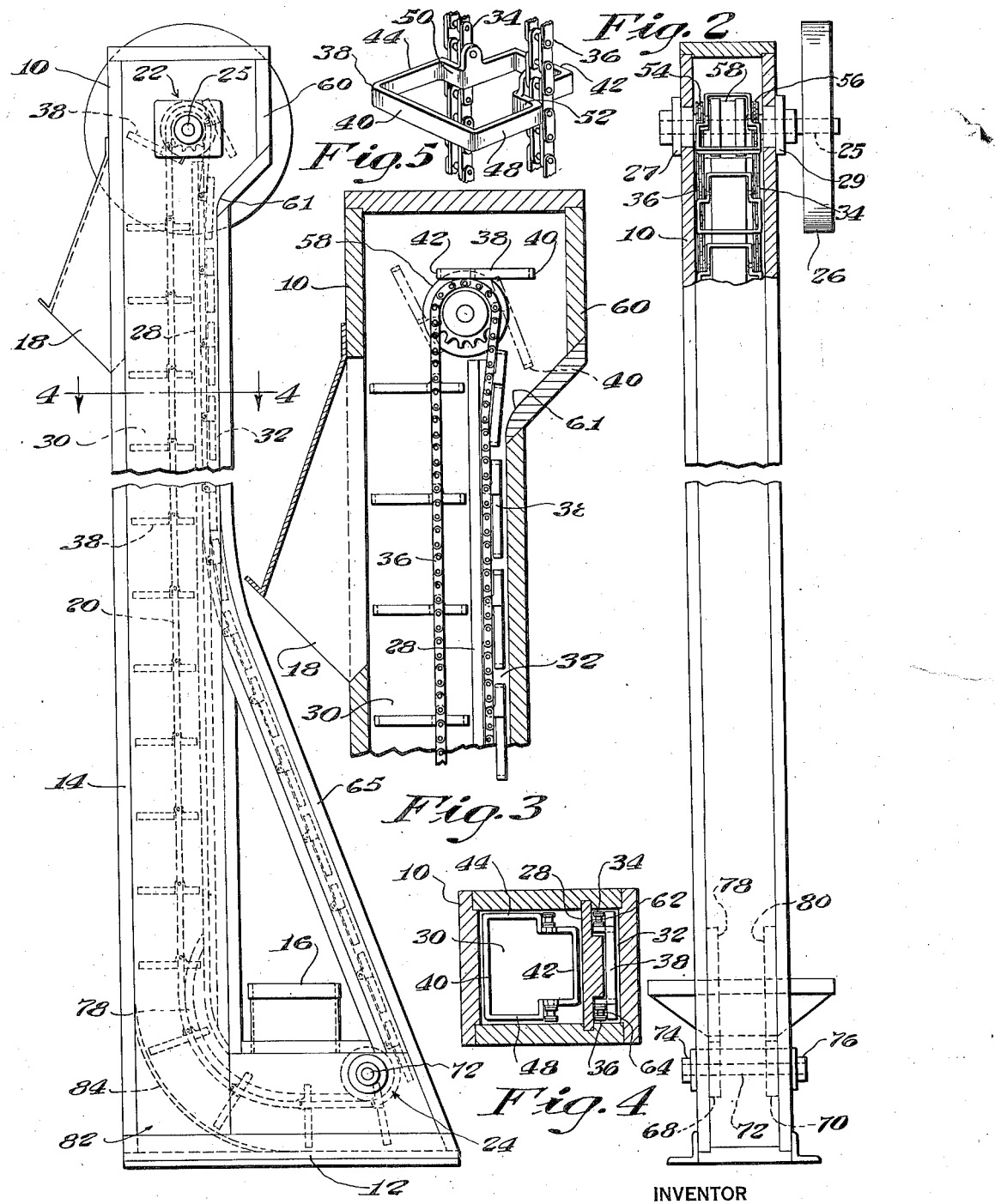

2,252,033

UNITED STATES PATENT OFFICE 2,252,033

CONVEYER

Arnold Redler, Stroud, England, assignor to Redler Conveyor Company, Quincy, Mass., a corporation of Massachusetts Application July 19, 1938, Serial No. 219,992
In Great Britain April 10, 1937

3 Claims. (Cl. 198—170)

This invention relates to a conveyer for conveying flowable solid material.

One object of the invention is to provide a novel and improved conveyer of the character specified having a novel and improved conveying element of a construction such as to enable the conveyer to be efficient in operation and at the same time to enable the return run of the conveyer to be constructed of reduced size as compared with the working run, and accordingly to enable the conveyer to be constructed at minimum expense.

A further and more specific object of the invention is to provide a novel conveyer of the character specified provided with a novel and improved conveying element having spaced flights adapted to assume a position transverse to the direction of movement of the conveying element while traversing the working run of the conveyer and to assume a position substantially parallel with the direction of movement of the conveying element while traversing the idle run of the conveyer, thus contributing to economy in power consumption in the operation of the conveyer.

With these general objects in view, and such others as may hereinafter appear, the invention consists in the conveying element, in the conveyer and in the various structures, arrangements and combinations of parts hereinafter described and particularly defined in the claims at the end of this specification.

In the drawing illustrating the preferred embodiment of the invention, Fig. 1 is a side elevation of a conveyer embodying the present invention; Fig. 2 is an end view of the conveyer shown in Fig. 1, the upper portion being shown broken away and partly in cross-section; Fig. 3 is an enlarged detail view of the upper portion of the conveyer shown in Fig. 1 with the casing being shown in cross-section; Fig. 4 is an enlarged detail view in cross-section taken on the line 4—4 of Fig. 1, and Fig. 5 is a perspective view showing a portion of the conveying element.

In general, the present invention contemplates a novel conveyer having a novel and improved conveying element which is particularly adapted for use as the conveying element in a conveyer of the general type forming the subject matter of the Redler United States Reissue Patent No. 18,445, of April 26, 1932, for conveying flowable solid material and the construction of the novel conveying element is such as to enable a conveyer of reduced dimensions to be employed. In the preferred form of the invention the conveying element comprises spaced flights pivotally connected to endless chains arranged to run in a casing or conduit having a working run through which the material is conveyed and an idle run comprising the return run of the conveyer. In operation, the pivotally connected flights are caused to assume an operative conveying position transverse to the run of the conveyer, to effect conveyance of the material therethrough, and to assume an inoperative position substantially parallel to the run of the conveyer while being drawn through the idle run. The construction of such a conveying element enables the conduit or casing for the idle run of the conveyer to be made considerably smaller in proportion to the working run, resulting in a conveyer of substantially reduced dimensions as compared to the conventional conveyer, illustrated and described in the Redler reissue patent above referred to, and effecting economies in the cost of construction and in the power consumed in the operation thereof.

Referring now to the drawing, the conveyer in general comprises a conveyer of the type forming the subject matter of the Redler reissue patent above referred to, which is characterized by its ability to convey the flowable solid material in a continuous stream. The different features of the invention have, for purposes of illustration, been herein shown as embodied in a vertical conveyer of the elevator type and as herein shown, 10 represents a casing or conduit having a horizontal portion 12 and a vertical leg 14. An inlet 16 is provided in the horizontal portion 12 through which the solid flowable material to be conveyed is introduced and the material is discharged through an outlet 18 in the vertical leg 14 of the casing. The conveying element 20 is arranged to pass over terminals 22, 24 disposed at either end of the conveyer and, as herein shown, the upper terminal 22 is arranged to be driven through a driving pulley 26 belted to any convenient source of power, not shown. The conveying element consists of a plurality of spaced conveyer flights and the conveyer flights may and preferably will be of open structure capable of effecting the conveyance of the flowable solid material in a continuous stream.

The casing 10, through which the conveying element 20 is drawn, is herein shown as of general rectangular shape in cross-section as illustrated in Fig. 4, and is provided with a partition 28 which divides the casing into a square sectioned leg 30, which is the working run of the conveyer, and an oblong sectional leg 32 of much smaller size than the section 30 and comprises the idle run of the conveyer. The conveying element as shown in detail in Fig. 5 may comprise a pair of chains 34, 36 spaced apart having open flights 38 of general rectangular shape pivotally connected to the inner sides of the parallel chains at intervals in the length thereof. The pivoted flights are arranged to be disposed in a plane transverse to the direction of movement of the chains when the latter are drawn through the working run 30 of the conveyer and to lie in a plane substantially parallel to the direction of movement of the chains when the latter are drawn through the idle run 32 of the conveyer. As illustrated in Figs. 4 and 5, each flight 38 has two straight sides 40, 42 and two offset sides 44, 48, forming shoulders 50, 52 which bear against the chains 34, 36 during the movement of the conveying element through the working run of the conveyer.

As herein shown, provision is made for pivoting the flights 38 from a position transverse to the direction of travel of the conveying element to a position parallel thereto as the flights pass over the upper terminal 22 in their travel from the working run 30 to the idle run 32 of the conveyer. The upper terminal 22 may comprise a pair of sprockets 54, 56 spaced apart over which the chains 34, 36 are arranged to run, having a flight guiding device in the form of a drum 58 arranged between and slightly larger in diameter than the sprockets. The sprockets and the drum are secured to the driving shaft 25 which is journalled in suitable bearings 27, 29 mounted in the walls of the conduit, 10.

In operation, as the pivotally connected flights approach the terminal 22 and start to pass around the sprockets, the inner edge of the side 42 of each flight is engaged by the drum 58 so that the flight is tilted as it passes around the terminal 22. As the chains with the flights again leave the sprockets 54, 56 to enter the idle leg 32, the flight lies in a position substantially parallel and adjacent to the chains. Thus, in the idle or return run 32 of the conveyer the chains and flights occupy a minimum of space, and offer minimum resistance to movement through the casing inasmuch as the flights are withdrawn from possible contact with the walls of the casing. The upper portion of the casing 10 is enlarged as at 60 to permit sufficient clearance for the flights as they swing around the upper terminal before they enter the idle run. The inner wall of the enlarged portion 60 of the casing may be curved as at 61, to assist in guiding the leading edge 40 of the flights into the return run. The return run 32 is preferably substantially tangent to the sprockets 54, 56 and the partition 28 may be rabbeted as at 62, 64 to accommodate the chains 34, 36.

As herein illustrated, the lower portion of the return run is arranged to guide the conveying element through an outwardly and downwardly sloping part 65 to the lower terminal 24. The lower terminal comprises two disks 68, 70 mounted upon a cross-shaft 72 journalled in bearings 74, 76 secured to the walls of the casing 10. The disks 68, 70 are spaced apart to permit the narrow trailing edges 42 of the flights to pass between them so that during the operation of the conveyer, as the flights pass around the lower terminal, the leading edges 40 of the flights embed themselves into the material in the horizontal portion 12 of the casing so that as the conveying element progresses the flights are caused to assume a position at right angles to the run of the chains. As shown in Fig. 1, curved metal strips 78, 80 are provided to guide the conveying element 20 from the lower terminal around the bend 82 into the working run 30 of the conveyer. A suitable filling piece 84 is provided in the casing at the bend 82 where the conduit changes from a horizontal to a vertical path.

It will be noted that the distance from the point of connection of the flight to the forward edge 40 is greater than the distance from the pivotal point to the trailing edge 42 so that when the flights contact the material as they pass around the disks 68, 70, the pressure exerted on the forward edge 40 will tilt the flight to the position illustrated in Fig. 5 with the shoulders 50, 52 bearing against the chains.

From the description thus far, it will be observed that the present construction of conveying element enables a conveyer of substantially reduced dimensions for a given output of conveyer.

While the invention has been herein illustrated as embodied in a vertical or elevating conveyer it will be understood that the invention may be embodied in horizontal or other forms of conveyers within the scope of the following claims.

Having thus described the invention, what is claimed is:

1. For use in a conveyer for conveying flowable solid material having an enclosing conduit forming a working run and a second conduit forming a return or idle run, an endless conveying element arranged to be drawn through said runs having a series of open flights pivotally mounted thereon with portions of the flights projecting beyond opposite sides of the conveying element, said open flights being arranged when in a position transverse to the direction of movement of the conveying element through the working run to cooperate with some of the walls of the conduit forming the working run to effect conveyance of the flowable solid material therethrough in a continuous stream, and means causing said open flights to assume a non-cooperative position substantially parallel to the conveying element and adjacent thereto when the latter is being drawn through the return run.

2. For use in a conveyer for conveying flowable solid material having an enclosing conduit provided with a working run and a return run, an endless conveying element traversable through the conduit comprising a pair of parallel chains spaced apart and a plurality of spaced flight members of open construction mounted between the chains and pivoted directly thereto and projecting from each side thereof, each of said flight members comprising a rectangular shaped band having offset portions engageable with the outer surface of said chains to maintain the flight in a position transversely of the conduit when traveling through the working run and having a portion engageable with the chain to maintain the flight in a position parallel to said chains when traveling through the return run.

3. For use in a conveyer for conveying flowable solid material having an enclosing conduit provided with a working run and a return run, an endless conveying element traversable through the conduit comprising a pair of parallel chains spaced apart and a plurality of spaced flight members of open construction mounted between the chains, each of said flight members comprising a rectangular shaped band provided with upstanding ears pivotally connected directly to the chains, said band having offset portions engageable with the outer surface of said chains to maintain the flight in a position transversely of the conduit when traveling through the working run and having a portion engageable with the chain to maintain the flight in a position parallel to said chains when traveling through the return run, said flights being arranged to be tilted from their parallel condition to their transverse position when engaged by the material in the conduit in passing from said return run to said working run, and means for returning the flights to their parallel condition when passing from the working run to the return run.

ARNOLD REDLER.